United States Patent Office 2,807,532
Patented Sept. 24, 1957

2,807,532

METHOD OF PREPARING NICKEL CATALYST

John H. Hahn, Mehlville, Mo., assignor to Monsanto Chemical Company, St. Louis, Mo., a corporation of Delaware No Drawing. Application December 30, 1954,
Serial No. 478,864

5 Claims. (Cl. 75—.5)

This invention relates to the preparation of finely-divided nickel catalysts and more specifically pertains to the formation of finely-divided nickel catalysts by thermal decomposition of nickel organic compounds.

Finely-divided nickel catalysts have been prepared in numerous ways and each type of finely-divided nickel catalyst according to its method of preparation appears to have a different or selective catalytic activity. Finely-divided nickel prepared by the thermal decomposition of nickel organic compounds has been useful in various hydrogenation processes. Since finely-divided nickel freshly prepared by thermal decomposition is pyrophoric in nature, it has been considered by prior practices and considered essential by prior practices to thermally decompose the nickel organic compounds dispersed in an oily substance which would prevent contact between the freshly prepared nickel and air and which would provide a medium for heating permitting better control of temperature during decomposition. Thus according to the prior art processes, the finely-divided nickel obtained from the thermal decomposition of a nickel organic compound such as nickel formate was always in a suspension of an oily material. Where the finely-divided nickel is to be used as a catalyst for the hydrogenation of an oil or oily substance, the use of the suspension of the finely-divided nickel in the oil in which it was prepared had little or no serious drawbacks. However, serious disadvantages are encountered with the use of finely-divided nickel suspended in oil as a means for introducing the catalyst into a hydrogenation system involving the hydrogenation of a chemical compound whose hydrogenation product was not an oil and especially where the hydrogenation product is to be employed in a chemical process where the oil would interfere.

For example, in the hydrogenation of maleic anhydride to succinic anhydride, the use of finely-divided nickel suspended in light mineral oil results in a succinic anhydride product contaminated with oil, and although this succinic anhydride is distilled, it still contains mineral oil as an impurity, for the mineral oil is not removed by distillation. Steam distillation of the succinic anhydride is impractical since the succinic anhydride reacts with the steam to form succinic acid. Furthermore, removal of the mineral oil by extraction with a suitable solvent is a time consuming and costly operation.

It has now been discovered that an exceedingly useful form of finely-divided nickel can be prepared for use in catalytic processes by the dry thermal decomposition of nickel formate. By "dry thermal decomposition" as employed herein in the specification and claims is meant the decomposition of the compound nickel formate per se as well as the thermal decomposition of its dihydrate without suspending, dispersing or mixing said nickel formates in any liquid medium prior to the thermal decomposition. The dry thermal decomposition process of this invention involves heating a nickel formate, i. e. nickel formate as well as its dihydrate to a temperature of from 120° to 350° C. in the presence of an inert atmosphere such as provided by carbon dioxide, nitrogen, hydrogen, helium, argon and the like. The preferred modification of the process of this invention involves the dry thermal decomposition of a nickel formate by heating a nickel formate slowly over a period of 5 to 20 hours, at a temperature of from about 250° to 350° C. and most preferably from about 300 to 310° C. in an inert atmosphere while slowly stirring the solid material.

The process of this invention can be most conveniently carried out by slowly heating nickel formate in an inert atmosphere preferably carbon dioxide at a relatively low positive pressure of carbon dioxide, while constantly withdrawing the gaseous products of the thermal decomposition, adding carbon dioxide to the atmosphere in contact with the decomposed nickel formate and slowly stirring the solid material. The gaseous products of the thermal decomposition are mainly carbon dioxide, hydrogen and carbon monoxide with a very small amount of methane. In the literature it is reported that the gaseous products of the decomposition of nickel formate comprises about 62% carbon dioxide, 25% hydrogen, 11% carbon monoxide and about 0.6% methane. More specifically, the process of this invention can be carried out by charging a nickel formate such as nickel formate or its dihydrate to a reaction vessel having a means for heating and a means for slowly stirring or raking the material contained therein, a means for continuously withdrawing part of the atmosphere in the reaction vessel and a means for charging a gas into the internal atmosphere of the reaction vessel. Into such a vessel there is charged the nickel formate or dihydrate and the atmosphere in contact with said nickel formate is purged several times with carbon dioxide until the atmosphere therein is essentially carbon dioxide. Then heat is slowly applied to heat the nickel formate slowly over a period of from about 5 to 20 hours to the decomposition temperature. As the nickel formate is heated, a portion of the internal atmosphere in contact with the nickel formate is withdrawn and the input of carbon dioxide is adjusted to maintain a slight positive pressure of carbon dioxide in the vessel, a $CO_2$ pressure of about 1" to about 5" of water being sufficient although higher pressures can be employed if desired. Then the solid material is slowly stirred, a rate of movement of the stirring devices as low as 1.0 revolution per minute up to 200 R. P. M. or thereabout being adequate. As the rate of thermal decomposition increases, it is desirable to increase the discharge of the gases from the atmosphere inside the reaction vessel so that the internal pressure does not increase thereby permitting a constant flow of fresh carbon dioxide into the atmosphere in contact with the decomposing nickel formate. When the thermal decomposition has been completed, the finely-divided nickel remaining in the reaction vessel can be suspended in any suitable material. For example, when the finely-divided nickel is to be employed as the catalyst for the hydrogenation of maleic anhydride to succinic anhydride, molten maleic anhydride can be charged to the decomposition vessel and the finely-divided nickel catalyst dispersed in the molten maleic anhydride. Then while the maleic anhydride is still fluid, portions of the mixture of finely-divided nickel dispersed in maleic anhydride can be withdrawn to suitable containers for use in the catalytic hydrogenation process. In this manner, the freshly prepared finely-divided nickel is protected from the oxygen in the atmosphere and this mixture is not at all pyrophoric. Furthermore, since the material to be hydrogenated is maleic anhydride, the catalyst is suspended in a material which will not introduce any impurities into the final product.

Dry thermal decomposition of nickel formate has been reported in the literature. It was reported in Acta Physicachim, U. R. S. S. 12, 737–58 (1940) by A. A.

Balandin, E. S. Grigoryan and Z. S. Yanyshena that finely-divided nickel products obtained by the dry thermal decomposition of nickel formate are inactive as catalysts for hydrogenation processes. This article suggests that it is essential to thermally decompose nickel formate dispersed in an oil so that carbon monoxide and other soluble products formed during the initial stages of the decomposition can be removed from the finely-divided nickel. However, the finely-divided nickel product formed by the process of this invention, quite unlike those prepared as reported in the cited article, are exceedingly useful hydrogenation catalysts as will be apparent from the examples of the use of the materials prepared by the process of this invention.

The process of this invention will be illustrated by the preparation of finely-divided nickel catalysts by the following specific examples in which the term "parts" is employed to indicate parts by weight.

*Example I*

Into a suitable reaction vessel having a line for charging carbon dioxide, the discharge for removing a portion of the atmosphere from the vessel, a means for heating the contents of the vessel and a means for stirring solid material at the bottom of the vessel, there is charged 180 parts of nickel formate dihydrate, the reaction vessel is closed and carbon dioxide is added to the reaction vessel at a rate of about 4 cu. ft. per minute for about 5 minutes, while through the discharge line gases are removed at about the rate of 4 cu. ft. per minute. This flushing of the atmosphere of the reactor is continued until the atmosphere in the reactor is substantially carbon dioxide and generally requires from about 5 to 10 minutes. After this flushing period, the rate of input of carbon dioxide as well as the rate of discharge thereof is adjusted to about 0.5 to 0.7 cu. ft. per minute as soon as a positive pressure in the reactor of between about 1 to 1.5" of water is obtained. Heating of the reactor is started at such a rate as to heat the contents to about 300° to 310° C. in about 6 to 8 hours while the solid material in the vessel is stirred with an agitator speed of about 5 to 10 R. P. M. As the gaseous products of the thermal decomposition are formed, the discharge of gaseous materials from the atmosphere of the reaction vessel is increased. When the contents of the reaction vessel reach a temperature of 300 to 310° C., only sufficient heat is applied to the vessel to maintain its contents at this temperature until the rate of discharge from the vapor space of the reactor drops to about the rate of input of the carbon dioxide indicating that the thermal decomposition is concluded. At this point the rate of input of carbon dioxide is increased to maintain a positive pressure on the reaction vessel while the contents thereof are permitted to cool to about 90° C. At this point the catalyst is ready for use.

When the above prepared nickel catalyst is to be employed in the preparation of succinic anhydride about 180 parts of maleic anhydride are added to the vessel, the mixture of maleic anhydride and finely-divided nickel are stirred, and sufficient heat is supplied to melt the maleic anhydride. Carbon dioxide is introduced into the vessel during stirring and suspension of the nickel in maleic anhydride as well as during the withdrawal of this suspension from the vessel. The suspension of nickel in molten maleic anhydride is withdrawn into suitable containers while maintaining a positive pressure of carbon dioxide in the vessel. When all of the mixture of maleic anhydride and finely-divided nickel has been removed from the reaction vessel, the input of carbon dioxide can be stopped.

*Example II*

The process described in Example I is repeated except that 275 parts of nickel formate dihydrate were charged to the vessel and the decomposition was accomplished at a temperature of 315 to 320° C. over a period of 16 hours under a positive pressure of carbon dioxide of about 1.5" of water and at an agitator speed of about 50 R. P. M. Also, the amount of maleic anhydride employed to suspend the finely-divided nickel is 275 lbs.

The following demonstrates that the finely-divided nickel prepared according to the process of this invention does have catalytic activity. There is charged to hydrogenation equipment 343 parts of maleic anhydride and 7 (28.5% solids) parts of a mixture of maleic anhydride and finely-divided nickel prepared in Example I. The oxygen in the atmosphere of the hydrogenation equipment is removed by evaporation and replacement by hydrogen. Then hydrogen is charged to a positive pressure of 300 pounds per square inch and the maleic anhydride heated to 140° C. and there maintained. Hydrogen is charged to the reaction vessel at 300 p. s. i. corresponding to the reaction vessel until hydrogen is no longer absorbed; about 2 hours. Thereupon, the hydrogen supply is shut off and no further heat is supplied to the reactor. The succinic anhydride so produced is recovered.

The same process conducted with finely-divided nickel obtained by the thermal decomposition of nickel formate suspended in mineral oil requires 2 hours time. However, the resulting succinic anhydride is contaminated by the oil and solutions prepared from this succinic anhydride are turbid.

The process described in either of Examples I or II can be carried out employing nitrogen, helium or argon as the inert atmosphere. Also when the catalyst is to be immediately employed in a hydrogenation process, the dry decomposition of a nickel formate can be carried out in a vessel where hydrogen supplies the inert atmosphere.

The process of this invention has been demonstrated by means of specific examples. These examples are intended as illustrative of this invention and not as a limitation thereon for many modifications of the above process within the spirit of this invention will be apparent to those skilled in the art.

What is claimed is:

1. In the thermal decomposition of nickel formate to provide finely-divided nickel for catalysis, the step comprising heating from about 120° to about 350° C., a nickel formate in an inert atmosphere.

2. In the thermal decomposition of nickel formate to provide finely-divided nickel for catalysis, the step comprising heating from about 250° to about 350° C., a nickel formate in an inert atmosphere comprising essentially carbon dioxide.

3. The process of claim 2 wherein nickel formate is thermally decomposed.

4. The process of claim 2 wherein nickel formate dihydrate is thermally decomposed.

5. In the thermal decomposition of nickel formate to provide a finely-divided nickel for catalysis, the steps comprising heating from about 300° to about 310° C., a nickel formate in an atmosphere of essentially carbon dioxide while continuously removing a portion of the resulting atmosphere and replacing the withdrawn gases with carbon dioxide.

References Cited in the file of this patent

UNITED STATES PATENTS 1,390,685     Ellis _____ Sept. 13, 1921